Sept. 25, 1928.

G. W. ENGSTROM 1,685,279

TRACTOR

Filed July 28, 1922

Inventor.
G. W. Engstrom,
By H. P. Deakins
Atty.

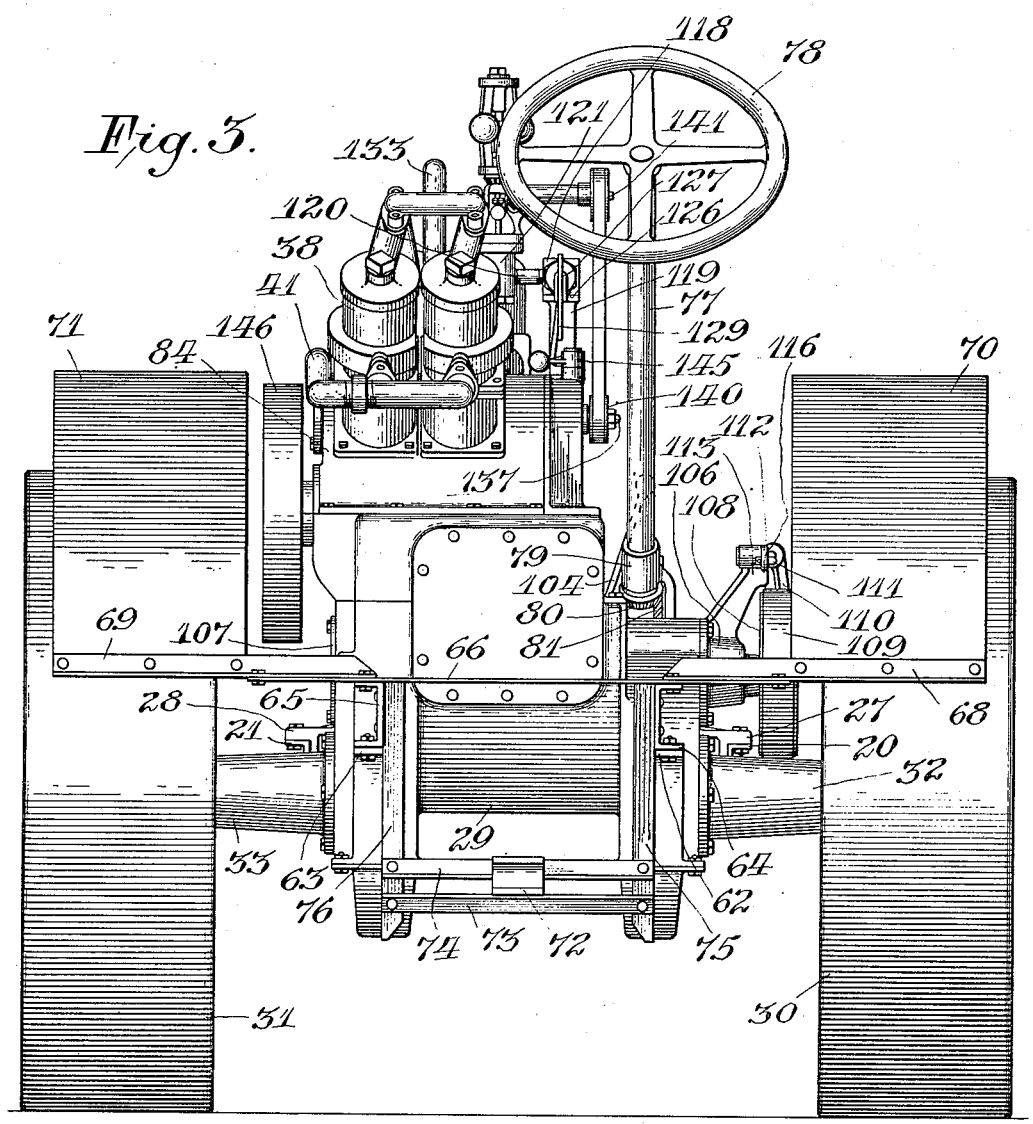

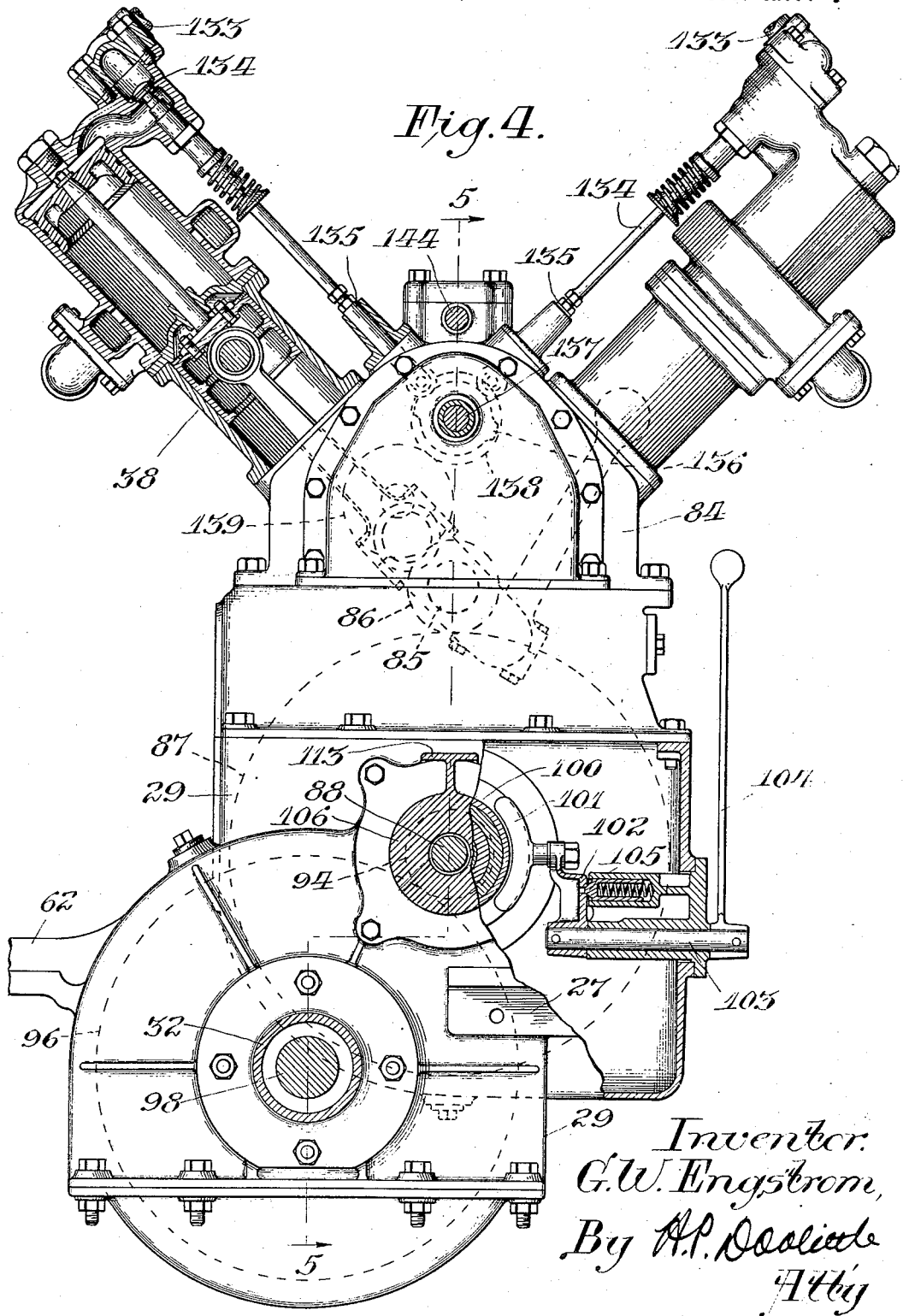

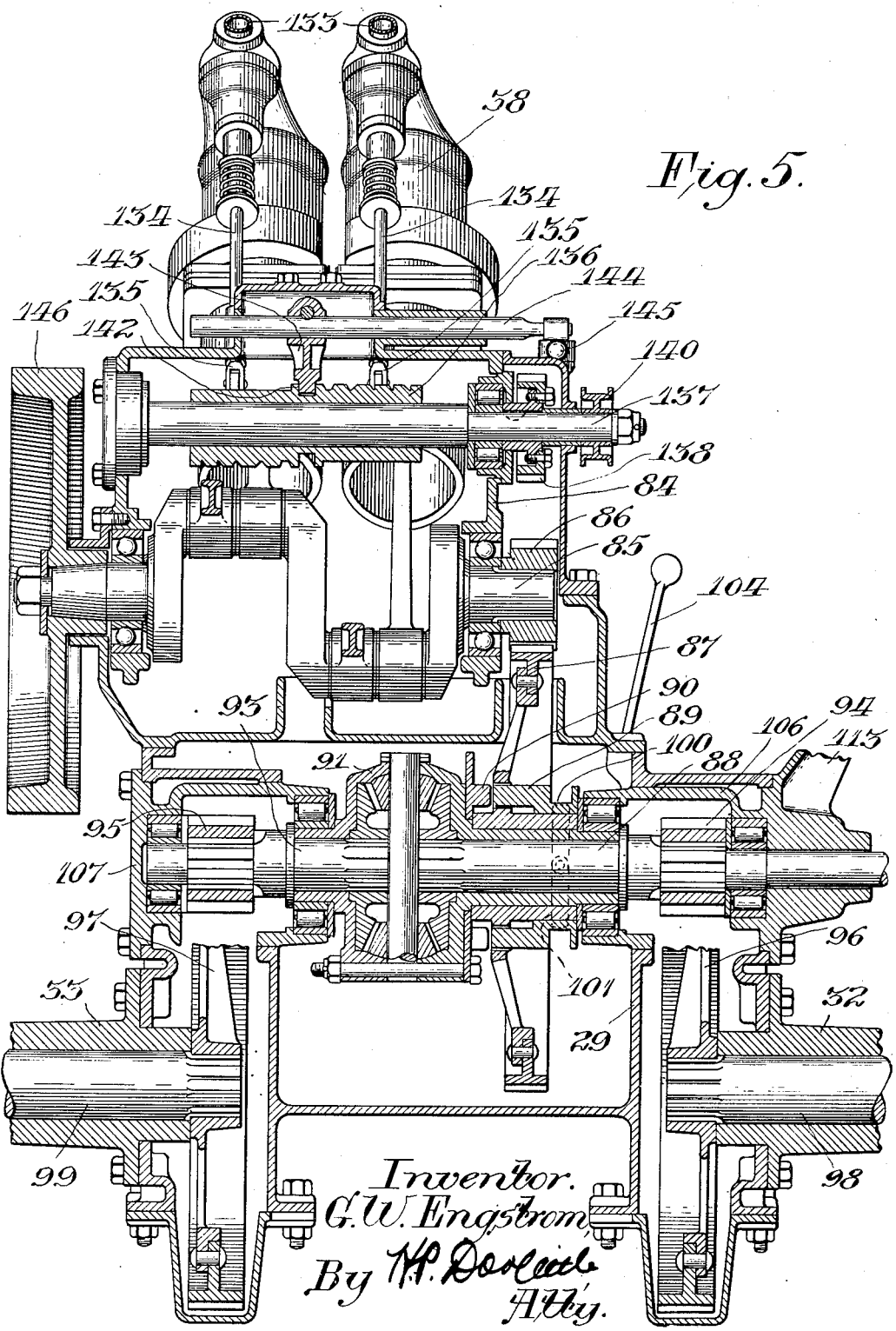

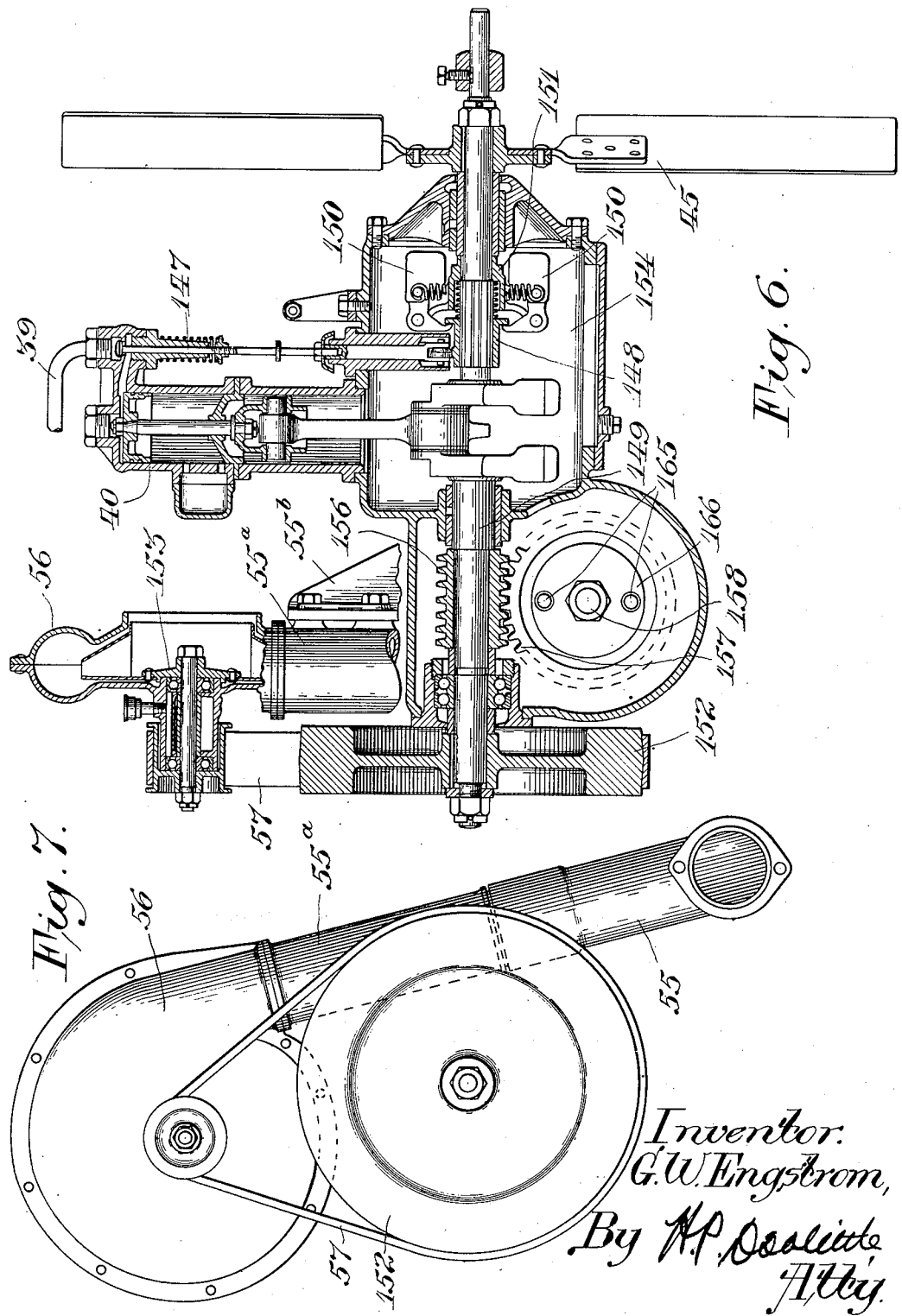

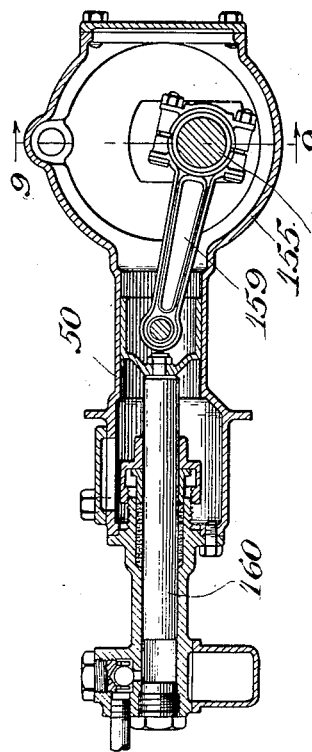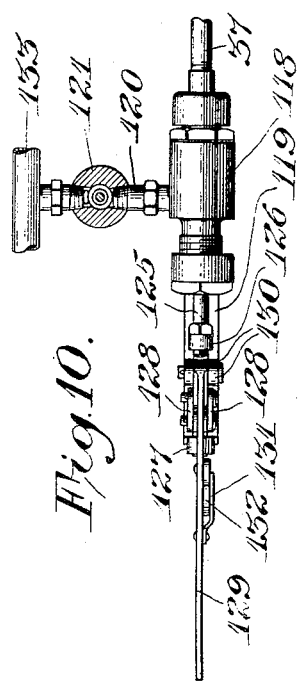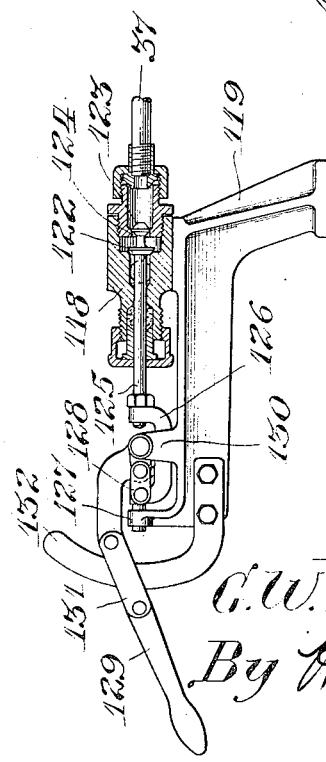

Patented Sept. 25, 1928.

1,685,279

UNITED STATES PATENT OFFICE.

GUSTAF W. ENGSTROM, OF RIVERSIDE, ILLINOIS, ASSIGNOR TO INTERNATIONAL HARVESTER COMPANY, OF CHICAGO, ILLINOIS, A CORPORATION OF NEW JERSEY.

TRACTOR.

Application filed July 28, 1922. Serial No. 578,071.

My invention relates to tractors and particularly to steam propelled tractors and parts thereof.

Steam tractors are easier to operate than tractors propelled by internal combustion engines but heretofore have been available only in large sizes not suitable for use on small farms and for general power purposes, since it has generally been considered impracticable to build steam tractors in small sizes.

The object of my invention is, therefore, to provide a steam tractor that may be made in small sizes of equal or greater power and of less first cost and operating expense than the corresponding sizes of gas engine tractors now on the market.

It is also an object of my invention to arrange and correlate the several parts of a steam propelled tractor so as to provide a neat, compact and efficient power plant and tractor.

In the drawings I have illustrated a preferred form of my invention in which—

Fig. 3 is a rear elevation;

Fig. 4 is an end elevation of the main engine;

Fig. 5 is a section of the main engine and transmission mechanism taken substantially on the line 5—5 of Fig. 4;

Fig. 6 is a section through the auxiliary engine;

Fig. 7 is an end view of the blower;

Fig. 8 is a horizontal section of the feed pump;

Fig. 9 is a section on the line 9—9 of Fig. 8;

Figs. 10 and 11 are details of the throttle valve; and

Fig. 12 is a side elevation of the brake lever.

Figure 1:
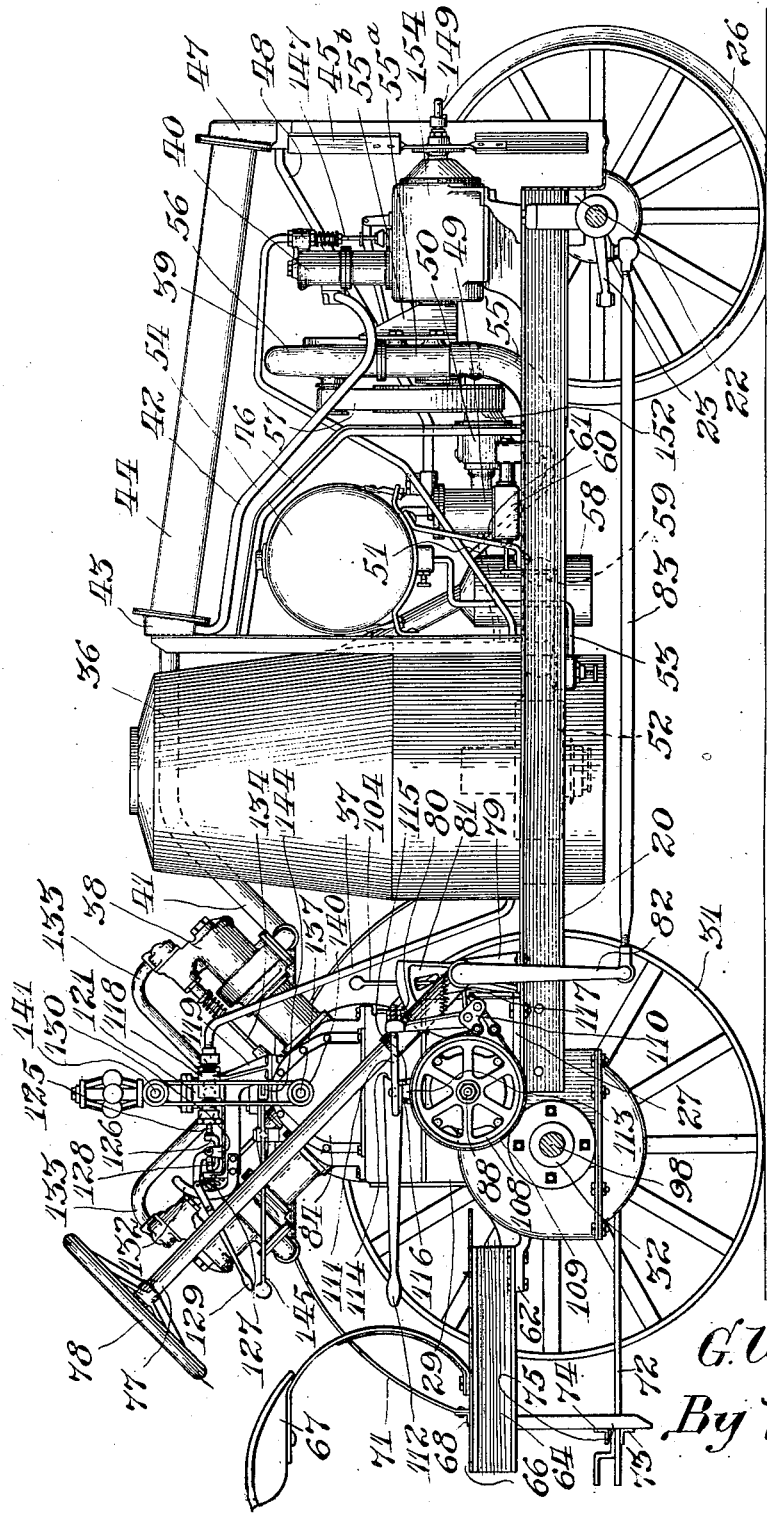
Fig. 1 is a side elevation of a tractor, the wheels on the side toward the observer being omitted.
Figure 2:
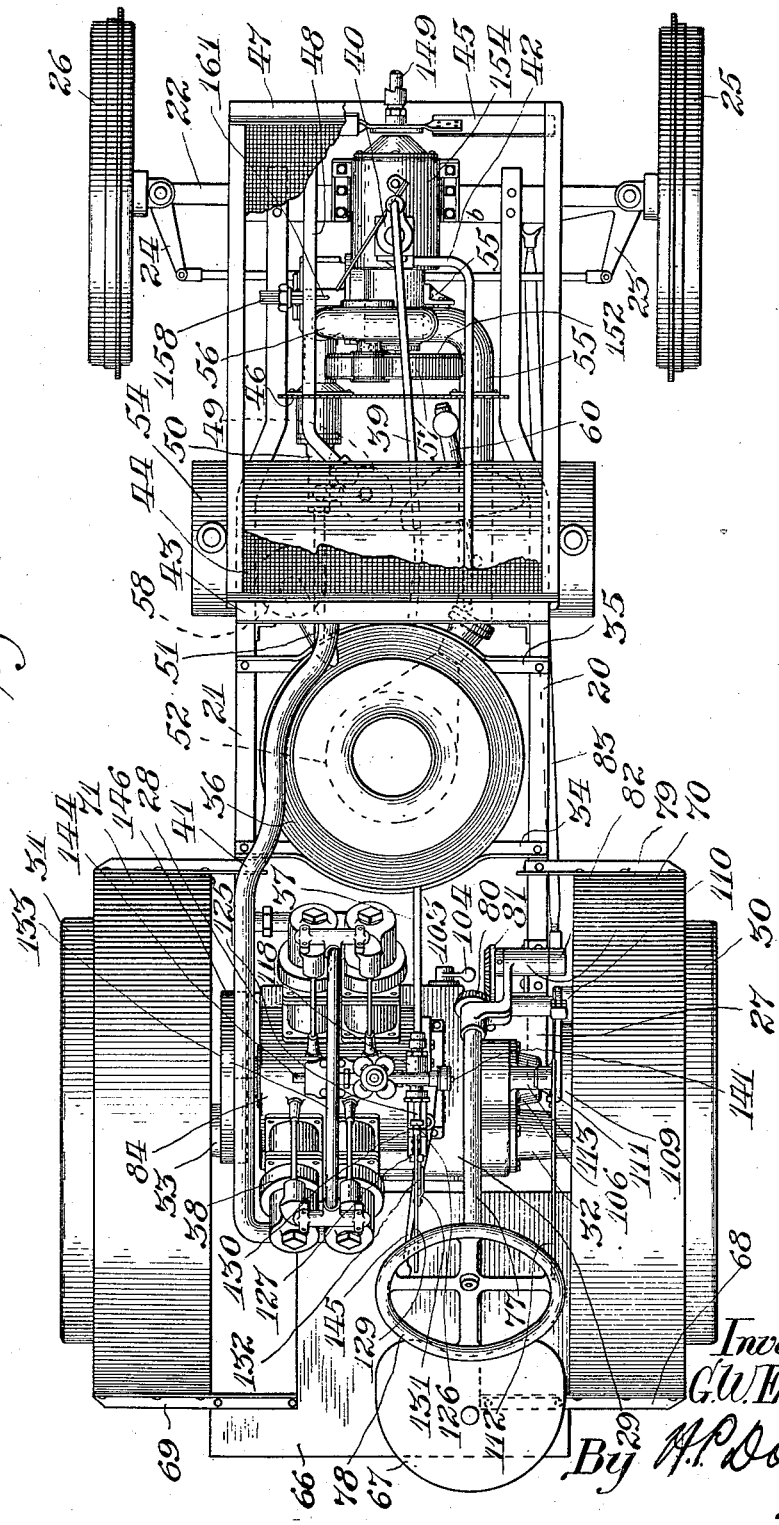
Fig. 2 is a plan view, the condenser being broken away to show the auxiliary engine and accessories.

The frame of my improved tractor has two side members 20, 21 formed from channels and supported at their front ends on the axle 22 pivotally connected to the steering knuckles 23, 24 on which the steering wheels 25, 26 are journaled. The rear ends of the channels are bolted to brackets 27, 28 cast integral with the transmission and differential casing 29. The rear end of the tractor is supported by the traction wheels 30, 31 secured to corresponding driving shafts or axles journaled in the extended hubs 32, 33 bolted to opposite sides of the casing 29. A pair of cross bars 34, 35 secured to the channels brace the frame and support a boiler 36 which delivers steam through the steam main 37 to the main engine 38 and through a pipe 39 to an auxiliary engine 40. The engines exhaust through the respective pipes 41, 42 into the header 43 of a condenser 44 which is mounted on the front end of the tractor so that a fan 45 directly connected to the auxiliary engine 40 will draw air down through the condenser and discharge it in front of the tractor. A partition 46 closes the space at the rear of the auxiliary engine and a hood (not shown) closes the spaces at the side of the condenser so that all air drawn by the fan 45 comes through the condenser. The core of the condenser may be of cellular or tubular construction and slopes from the header 43 to the header 47 from whence a pipe 48 leads the condensed steam to a float chamber or hot well 49 from which the feed pump 50 driven from the auxiliary engine draws its supply. The pump discharges into the boiler 36 through the feed water pipe 51. The boiler is heated by a main burner 52 which is supplied with fuel through a pipe 53 leading from a fuel tank 54 and receives air through conduit 55 from the blower 56 driven by a belt 57 from the auxiliary engine. The boiler and main burner are heated preparatory to starting by an auxiliary burner 58 which may be of any suitable type. The air supply pipe 55 is controlled by a throttle valve 59 connected to a pressure regulator 60 which is actuated by pressure from the boiler through a pipe 61 which is shown in the drawings as a branch from the steam pipe 39 but may be connected directly to the boiler or to any other suitable pipe. When the pressure in the boiler equals or is below a predetermined working pressure, the throttle valve 59 remains open, but if the pressure exceeds a predetermined maximum, the regulator operates to close the throttle valve until the pressure has dropped to a predetermined minimum when the valve is again opened.

The boiler, burner, pressure regulator and hot well are shown only in outline and per se form no part of the present invention, they being included in the combination only as illustrations of devices capable of performing certain necessary functions. These parts are shown in detail and claimed in the co-pending applications of C. A. French No. 566,710 filed June 8, 1922; C. A. French 566,-713, filed June 8, 1922; and my Patents Nos. 1,608,589 November 30, 1926 and 1,613,879 January 11, 1927.

The transmission casing has a pair of rearwardly extending brackets 62, 63 to which the rearwardly extending channels 64, 65 are secured. The channels form a support for a platform 66 to which the seat 67 and brackets 68, 69 are secured, the brackets being formed from light angles and supporting the rear end of the guards 70, 71 for the traction wheels. A draw bar 72 is secured at its front end to the casing 29 and its rear end is laterally adjustable between the horizontal guides 73, 74 carried by the vertical brackets 75, 76. A steering shaft 77 has a steering wheel 78 at its upper end and at its lower end is rotatably supported in a bracket 79 bolted to the channel 20 and carrying a bevel gear 80 meshing with a segment 81 rigid with the steering arm 82. A link 83 connects the steering arm with the steering knuckle 23.

The main engine is a uni-flow engine of the V-type having four cylinders, two on each side of the crank case 84 in which the crank shaft 85 is journaled. The crank case is bolted to the transmission and differential casings 29. A gear 86 on the crank shaft 85 meshes with a gear 87 journaled on the differential shaft 88, said gear 87 carrying a clutch element 89 adapted to engage a corresponding clutch element 90 on the differential drum 91 which houses a differential connecting the shaft 88 and a second differential shaft 93 in alignment therewith. The differential shafts carry pinions 94, 95 respectively meshing with gears 96, 97 keyed to the axles 98, 99 of the drive wheels 30, 31. The clutch 89 has a groove 100 engaged by a shipper 101 secured to an arm 102 on the rock shaft 103 to which the clutch lever 104 is fastened. A spring pressed detent 105 engages the arm 102 to hold the clutch in engaged or disengaged position.

The differential shafts 88, 93 are supported in bearing cages 106, 107 and the shaft 88 extends beyond the cage 106 where it carries a brake drum 108. The drum is encircled by a band 109 the ends of which are connected to the lower end of a lever 110 on opposite sides of its fulcrum, the upper end of the lever being adjustably connected to one end of a link 111, the other end of which is connected to the brake lever 112, (see Figs. 1, 3 and 12). The lever 112 is mounted on a bracket 113 cast integral with the cage 106. The brake lever has an inclined or beveled end 114 adapted to engage a stop 115 on the arm 113 when the brake is released and the side of the lever engages a similar stop 116 when the brake is set. The pivotal connection of the link 111 is at one side of the center line of the brake lever so that when the brake is set the link falls below the fulcrum of the lever and holds the brake in set position. A spring 117 connected to the lever 110 releases the band from the drum when the brake lever 112 is raised.

The steam main 37 leads to a throttle 118, (Figs. 1, 10 and 11), controlling the supply of steam to the main engine. The throttle is carried by a bracket 119 mounted on the crank case 84 and has a valve body to the inlet of which the steam main 37 is connected and an outlet 120 leading to the governor controlled throttle 121. The valve 122 in the throttle closes with the steam pressure and has a head 123 closely fitting a bore 124 in the inlet passage. The valve stem 125 passes outward through a stuffing box and is connected to one end of a yoke 126, the other end of which is slidable in a guide 127 on the bracket 119. A pair of short links 128 are pivoted at one end to opposite sides of the yoke and at the other end to hand lever 129 fulcrumed on upstanding ears 130 of the bracket 119. The lever 129 is of bent form and carries a clip or strap 131 embracing an arcuate guide 132 bolted to the bracket. The link 128 and short arm of the lever 129 provide a powerful toggle for opening the valve against steam pressure which is normally between 500 and 600 pounds per square inch.

Beyond the governor controlled throttle 121, the steam enters a manifold 133 leading to the valves 134 of the respective cylinders. The inlet valves are of the puppet type and the lower ends of their stems engage tappets 135 having rollers contacting with cams 136 slidable on the cam shaft 137. The cam shaft has a gear 138 driven through an idler 139 meshing with the gear 86 on the crank shaft. The cam shaft also carries a pulley 140 for driving the governor shaft 141. The governor is of the fly-ball type and may be of any conventional form. The cam sleeve 136 is slidable on the shaft and has eight rises or cams, two for each inlet valve 134. Four of the cams cooperate with the respective valves for forward running of the engine and the other four for reverse drive. It will be understood that this number of cams is but illustrative and that any suitable number of sets of cams may be employed, the different sets being of different heights or length so as to give any desired cut-off in the cylinders. The sleeve has a central groove 142 engaged by a fork 143 carried by the rod 144 which is slidably mounted in the crank case. The forward and reverse lever 145 is pivoted to the crank case and connected to the rod 144 to shift the cam sleeve to change the direction of rotation of the engine. The engine is of the uniflow type and exhausts into the pipe 41 leading to the condenser. A fly wheel 146 secured to the crank shaft 85 serves as a convenient means for obtaining belt power to operate other machines such as saws, feed grinders, threshers etc.

The auxiliary engine 40 is a singe cylinder engine of the uni-flow type to which the supply of steam is controlled by a puppet valve 147. The valve is actuated by a tapered cam 148 slidable on the crank shaft 149 to vary the lift of the valve and point of cut-off of the steam. The cam is moved on the shaft by the governor weights 150 which are pivoted to a sleeve 151 rotatable with the shaft. The crank shaft 149 extends forwardly beyond the engine and carries the fan 45 for drawing cooling air through the condenser 44 and at its opposite end carries the fly-wheel 152 on which the belt 57 runs to drive the impeller 153 of the blower 56 for supplying air to the burner. The blower casing 56 is supported on a short section 55ª of the air supply pipe which section is secured to a bracket 55ᵇ bolted to the crank case 154 of the auxiliary engine. The crank case 154 is extended at one side and communicates with the crank case 155 of the feed water pump 50, (Figs. 6, 8 and 9). The crank shaft 149 has a worm 156 meshing with a wheel 157 loosely journaled on the crank shaft 158 of the pump which is connected by a pitman 159 to the pump piston 160 to operate it in the usual manner.

I have provided means for operating the feed pump by hand in order to fill the boiler or to make up for leakage in the system before starting the burner. A lever 161 is connected to one end of a shipper rod 162, the other end being secured to a fork 163 engaging in a groove on a clutch collar 164. The clutch collar has two or more pins 165 slidable in openings in the worm wheel 157 and adapted to be slid into and out of engagement with a clutch disk 166 keyed to the pump crank shaft. The shaft has a squared portion at one end for engagement by a crank 167 for manual operation. When it is desired to pump water into the boiler by hand, the crank 167 is placed on the end of the crank shaft and the lever 161 moved toward the left, (Fig. 9), to disengage the pins 165 from the disks 166. The piston 160 may then be reciprocated by rotation of the crank 167 without rotating the worm wheel 157.

In operation, the feed pump is operated by hand to fill the boiler to the required level if, for any reason, the water supply should be too low. The auxiliary burner 58, which may be a large blow torch, is started and soon generates sufficient steam at low pressure to start the auxiliary engine 40. The fuel supply to the main burner is then opened and the auxiliary engine started which supplies air for the main burner. With the main burner in operation, the steam pressure rapidly mounts up to 500 to 600 pounds per square inch which pressures are the limits between which my tractor operates and which the regulator 60 operates to maintain. It will be noted that, not only does the fan 45 draw cool air through the condenser, but that the blower 56 receives its supply of air through the condenser, thereby augmenting the work of the cooling fan and, at the same time, supplying heated air to the burner.

The crank case 154 of the auxiliary engine and case 155 of the feed pump form a closed chamber containing lubricant from which the working parts of the engine and pump are effectively lubricated. Similarly, the transmission and differential casing 29 and crank case 84 provide a lubricant chamber for the engine and driving connections to the rear wheels.

Having thus described my invention, what I claim is:

1. In combination, front and rear supporting wheels, a rear axle housing carrying a prime mover on the rear wheels, frame members supported at one end on the rear axle housing beneath the prime mover and at the other end on the front wheels, a boiler supported on the frame in front of the prime mover, a condenser mounted on the frame in front of the boiler, and means for returning condensed steam from the condenser to the boiler.

2. In combination, front and rear supporting wheels, a transmission case supported on the rear wheels, an engine supported above and on the transmission case, frame members supported at one end on the transmission case and at the other end on the front wheels, a boiler supported on the frame in front of the engine, a condenser mounted on the frame in front of the boiler, and means for returning condensed steam from the condenser to the boiler.

3. In combination, front and rear supporting wheels, a prime mover supported above and on the rear wheels and having driving connections therewith, frame members supported at their rear ends on the prime mover and at their front ends on the front wheels, a boiler on the frame adjacent the prime mover, a condenser mounted on the frame in front of the boiler and inclined down toward the front, and means for causing cooling air to flow over the condenser.

4. In a steam tractor, the combination of front and rear supporting wheels, an engine supported above and on the rear wheels and having driving connections therewith, a frame supported at its rear end on the engine and at its front end on the front wheels, a boiler on the frame for supplying steam to the engine, an inclined condenser on the frame in front of the boiler, an exhaust pipe leading from the engine to the upper end of the condenser, means for returning the condensed steam from the lower end of the condenser to the boiler, and means beneath the condenser for causing cooling air to flow downward through the condenser.

5. In a tractor, the combination of an engine mounted on the rear end thereof, a condenser mounted on the front end and sloping downward toward the front, a boiler between the condenser and engine, steam connections from the boiler to the engine and from the engine to the condenser, a burner for heating the boiler, a blower for supplying air to the burner, a pump for returning water from the lower end of the condenser to the boiler, a fan for drawing cooling air downward through the condenser, and an auxiliary engine for driving the blower, pump and fan, the blower, pump, fan and auxiliary engine being mounted beneath the sloping condenser.

6. In combination, a frame, a longitudinally disposed condenser mounted on supports above the frame, a partition dividing the space between the condenser and frame into front and rear compartments, an engine on the frame in the front compartment, and a fan in the front compartment driven from the engine and adapted to draw air downward through the condenser whereby the condenser will be cooled and heated air supplied to the blower.

7. In combination, a frame, a substantially horizontally disposed condenser longitudinally supported above the frame, an engine mounted on the frame beneath the condenser, a cooling fan and a blower below the condenser driven from the engine and drawing cooling air downwardly through the condenser, a burner on the frame, and a conduit connecting the blower to the burner.

8. In a steam tractor, the combination of front and rear supporting wheels, an engine supported above and on the rear wheels and having driving connections therewith, a frame supported at its rear and on the engine and at its front end on the front wheels, a boiler on the frame for supplying steam to the engine, a condenser on the frame in front of the boiler, an exhaust pipe leading from the engine to the condenser, means for returning the condensed steam to the boiler, and an operator's platform mounted on the engine and extending rearwardly therefrom.

9. In a steam tractor, the combination of front and rear supporting wheels, an engine carried above and on the rear wheels and having driving connections therewith, a frame supported at its rear end on the engine and at its front end on the front wheels, a boiler on the frame for supplying steam to the engine, an inclined condenser in front of the boiler and supported in a substantially horizontal position above the frame, means beneath the condenser for returning the condensed steam from the lower end of the condenser to the boiler, and a fan beneath the condenser for causing cooling air to flow downwardly therethrough.

10. In a steam tractor, the combination of front and rear supporting wheels, a transmission case supported on the rear wheels, an engine supported above and on the transmission case, frame members supported at one end on the transmission case and at the other end on the front wheels, a boiler on the frame members in front of the engine, an inclined condenser in front of the boiler and supported in a substantially horizontal position above the frame, an auxiliary engine on the frame members beneath the condenser, a pump on the frame members for returning condensed steam from the condenser to the boiler, a fan beneath the condenser for causing air to flow downwardly through the condenser, and driving connections from the auxiliary engine to the pump and fan.

In testimony whereof I affix my signature.

GUSTAF W. ENGSTROM.